(12) United States Patent
Le Chevalier

(10) Patent No.: US 11,837,110 B2
(45) Date of Patent: *Dec. 5, 2023

(54) METHOD OF EDUCATING USERS BY GAMIFICATION

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,305

(22) Filed: Oct. 16, 2021

(65) Prior Publication Data

US 2022/0036754 A1 Feb. 3, 2022

Related U.S. Application Data

(63) Continuation of application No. 16/569,457, filed on Sep. 12, 2019, now Pat. No. 11,151,891.

(60) Provisional application No. 62/731,342, filed on Sep. 14, 2018.

(51) Int. Cl.
| | | |
|---|---|---|
| *G09B 5/12* | (2006.01) | |
| *A63F 13/537* | (2014.01) | |
| *A63F 13/825* | (2014.01) | |
| *G09B 5/02* | (2006.01) | |

(52) U.S. Cl.
CPC ............. *G09B 5/12* (2013.01); *A63F 13/537* (2014.09); *A63F 13/825* (2014.09); *G09B 5/02* (2013.01)

(58) Field of Classification Search
None
See application file for complete search history.

(56) References Cited

U.S. PATENT DOCUMENTS

| | | | | |
|---|---|---|---|---|
| 2007/0288404 | A1* | 12/2007 | Kacmarcik | G06F 40/56 706/11 |
| 2008/0104033 | A1* | 5/2008 | Song | G06F 16/447 |
| 2008/0166692 | A1* | 7/2008 | Smith | G09B 7/00 434/362 |
| 2009/0132213 | A1* | 5/2009 | Zhao | G06K 9/6248 703/2 |
| 2014/0363802 | A1* | 12/2014 | Hutchinson | G09B 5/08 434/350 |
| 2017/0098380 | A1* | 4/2017 | Mihai | G09B 7/04 |
| 2020/0051460 | A1* | 2/2020 | Bedor | G09B 19/22 |

\* cited by examiner

*Primary Examiner* — Justin S Lee
(74) *Attorney, Agent, or Firm* — Morgan, Lewis & Bockius LLP; Manita Rawat

(57) ABSTRACT

A method of automatically providing personalized learning activities to users of an online learning platform is described. A quest is built based on an input of at least a first user's educational objective. The quest includes a primary quest that starts with a start node, ends with the end node, and includes a set of intermediate nodes, wherein each node of the primary quest must be traversed by the first user in order to complete the quest. The quest includes at least one secondary quest that starts with a node of the primary quest as its start node and includes a second set of intermediate nodes. As the user selects a node of the quest, educational activities related to its respective concept are presented to the user. The user's progress in the quest is tracked.

18 Claims, 14 Drawing Sheets

METHOD OF EDUCATING USERS BY GAMIFICATION

CROSS-REFERENCE TO RELATED APPLICATIONS

This application is a continuation of U.S. patent application Ser. No. 16/569,457, filed on Sep. 12, 2019, now U.S. Pat. No. 11,151,891, which claims priority to and the benefit of U.S. provisional application No. 62/731,342 entitled "Method of Educating Users by Gamification," filed on Sep. 14, 2018, which is herein incorporated by reference in its entirety for all purposes.

TECHNICAL FIELD

This disclosure relates to automatically providing personalized gamified learning activities to users of an online learning platform.

BACKGROUND

There is a need for an online learning platform that provides gamified personalized learning activities to its users.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
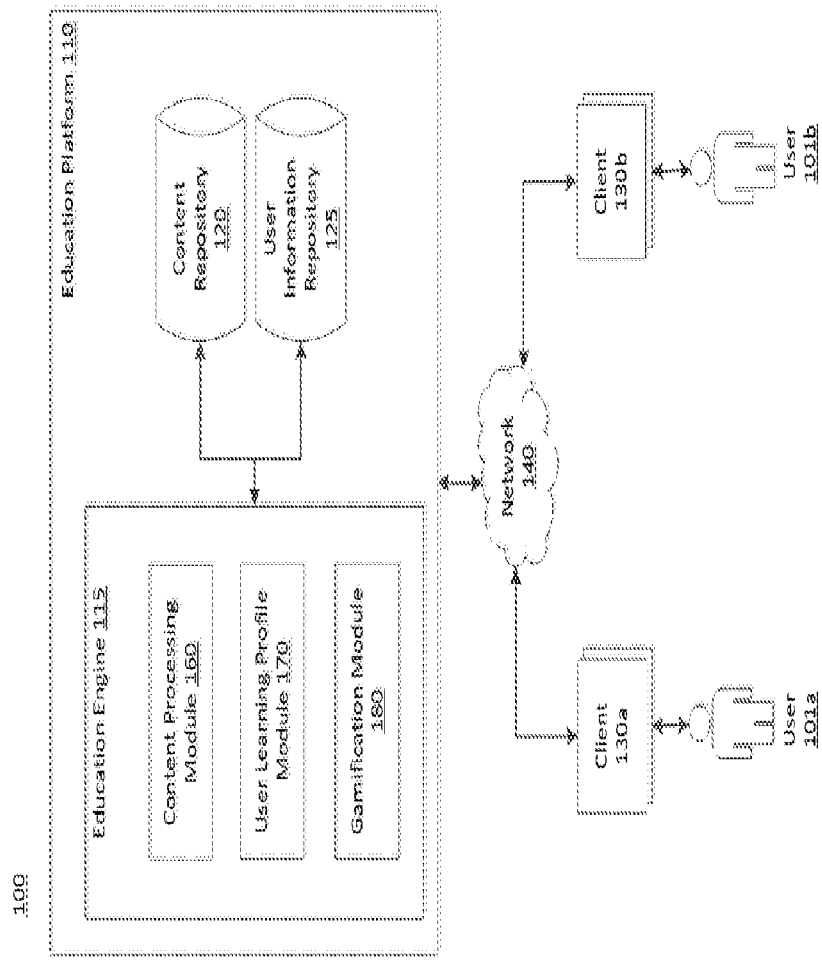
FIG. 1 illustrates an online education system 100 in accordance with some embodiments.

FIG. 1 illustrates an online education system 100 in accordance with some embodiments. Education system 100 includes an education platform 110 that provides personalized gamified education activities to a plurality of users, including users 101a and 101b. In some implementations, thousands, even millions of users use education platform 110 to access educational content.

The education platform 110 is communicatively coupled to client devices 130a and 130b via a network 140. A client 130 accesses digital content from education platform 110 through network 140 and presents digital content to user 101. Example client devices 130 include a desktop, a laptop, a tablet, a mobile device, smartphone, a smart television, a wearable device, etc. In some embodiments, client device 130 is a virtual reality device that enables a user 101 to have an immersive experience navigating the personalized learning activities. Client 130 may include software, such as a web browser or other application for rendering digital content. Client device 130 can be any device that is able to communicate with network 140 and render manifold visualizations (e.g., visualization 650) and quests (e.g., quest 720). A particular user 101 may access education platform 110 using one or more client devices 130 and may even start a session with education platform 110 with a first client device (e.g., laptop) and continue the session with a second client device (e.g., mobile device). FIG. 1 illustrates only two users 101a and 101b with respective client devices 130a and 130b. But, there could be thousands, even millions of users, each with one or more associated client devices.

Network 140 enables communications among the entities connected to them through one or more local-area networks and/or wide-area networks. In one embodiment, network 140 is the Internet and uses standard wired and/or wireless communications technologies and/or protocols. Data exchanged over network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Education platform 110 stores educational content items and serves these items to users of client devices 130 in accordance with some implementations. In the illustrated embodiment, the education platform 110 includes a content repository 120, a user information repository 125, and an educational content and learning activities engine 115, referred to as the education engine 115 hereafter. In some implementations (not illustrated), content repository 120 or a portion thereof, is provided by a third-party (not shown)

and may be communicatively networked with education engine 115, such as, via network 140.

In some implementations, content repository 120 includes a number of content entities, each content entity including content of a similar type, such as textbooks, courses, jobs, and videos. Accordingly, a textbooks content entity is a set of electronic textbooks or portions of textbooks. A courses content entity is a set of documents describing courses, such as course syllabi. A jobs content entity is a set of documents relating to jobs or job openings, such as descriptions of job openings. A videos content entity is a set of video files. An image content entity is a set of images, such as JPEGs, PNGs, etc.

Content repository 120 may include numerous other content entities, such as, a massive online open course (MOOC) content entity, a question and answer (Q&A) content entity, a user-generated content entity, white papers, study guides, or web pages. Furthermore, custom content entities may be defined for a subset of users of the education platform 110, such as sets of documents associated with a particular topic, school, educational course, or professional organization. The documents associated with each content entity may be in a variety of different formats, such as plain text, HTML, JSON, XML, or others. Content repository 120 is discussed further with reference to FIGS. 2A-C and 3. In some embodiments, content in the content repository 120 is acquired from professional content creators, such as book publishers, professors, teachers, production companies, record labels, etc., or from users 101, such as, when a user 101 uploads student notes, a draft of an essay, an assignment, citations, etc. to education platform 110. In other embodiments, content in content repository 120 may not be organized in content entities, but still may include one or more of the various content types described above (e.g., textbooks, Q&A, user-generated, white papers, study guides, web pages, plain text, HTML, JSON, XML, images, etc.). Content in content repository 120 may also include activities, referred to hereafter as PAR activities, and discussed further below.

Figure 4:
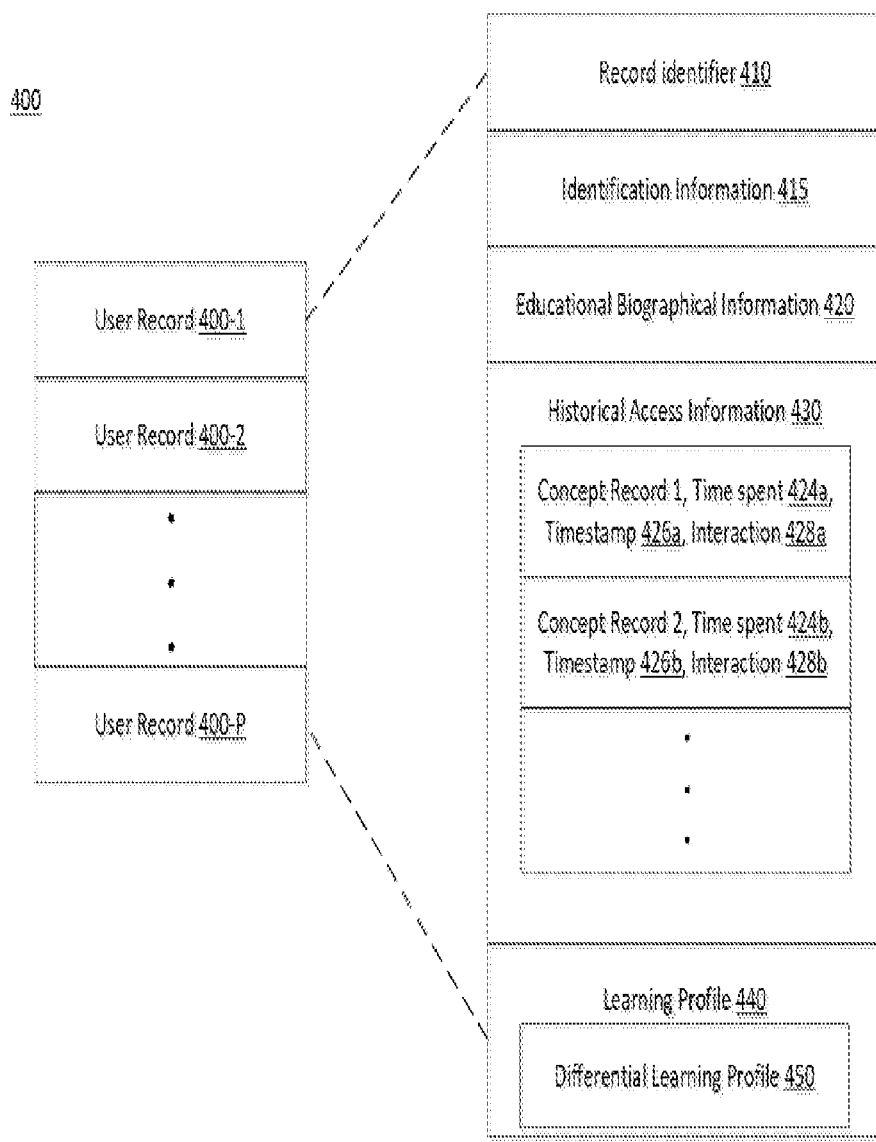
FIG. 4 depicts an example data structure for storing user information in some implementations.

User information repository 125 stores information for each user of education platform 110, such as for users 101, and is discussed further with reference to FIG. 4.

Education engine 115 provides gamified personalized learning activities to users of education platform 110 and is discussed further with reference to FIGS. 3-8. In some implementations, education engine 115 employs Artificial Intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning). Education engine 115 includes the following modules: content processing module 160, user learning profile module 170, and a gamification module 180. Content processing module 160 is discussed further with reference to FIG. 2A. User learning profile module 170 is discussed further with reference to FIG. 5. Gamification module 180 is discussed further with reference to FIGS. 6-8.

Many conventional features, such as firewalls, load balancers, application servers, failover servers, network management tools and so forth are not shown so as not to obscure the features of the system. A suitable service for implementation of the education platform is the CHEGG® service, found at www.chegg.com; other education platform services are known as well, and can be adapted to operate according to the teaching disclosed here. The term "service" in the context of the education platform 110 represents any computer system adapted to serve content using any internetworking protocols and is not intended to be limited to content uploaded or downloaded via the Internet or the HTTP protocol. The term "module" refers to computer program logic for providing a specified functionality. A module can be implemented in hardware, firmware, and/or software. A module is typically stored on a computer-readable storage medium such as storage device, loaded into a memory, and executed by a processor. In general, functions described in one embodiment as being performed on the server side can also be performed on the client side in other embodiments if appropriate. In addition, the functionality attributed to a particular component can be performed by different or multiple components operating together.

Figure 2A:
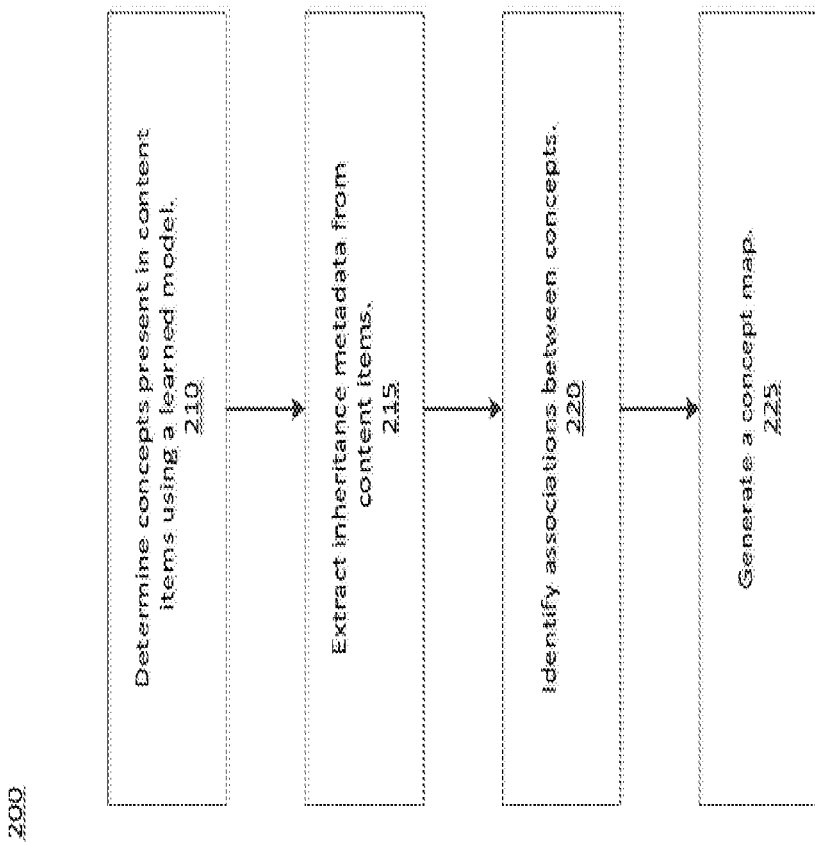
FIG. 2A is a flowchart illustrating a method 200 of determining concepts in a content repository in accordance with some embodiments.

FIG. 2A is a flowchart illustrating a method 200 of processing content in content repository 120 to generate concepts and concept maps. Method 200 is performed, for example, by content processing module 160 of education engine 115. Steps in the method 200 that are not order-dependent may be reordered and steps may be combined or broken out.

As discussed below with reference to FIG. 2A, in some embodiments, content processing module 160 uses topographical representations of discrete entities (here, concepts) and their inter-relationships to encode concepts that frequently co-occur together in training data in close proximity to one another in the semantic vector space while encouraging concepts that never or rarely co-occur to be distant from one another in the vector space. In some embodiments, the topographical representation is a manifold representation. The manifold is a high dimension semantic vector space that encodes the structure of semantic and syntactic inter-concept relationships. Accordingly, content processing module 160 seeks to find manifold representations of discrete entities (concepts) and their inter-relationships. In some embodiments, as discussed below, the manifold is able to process concepts that were not encountered and embedded during the training phase, in contrast to traditional semantic vector spaces, such as, Word2Vec, GLOVe, Conceptnet, Numberbatch, etc.

At 210, content processing module 160 determines concepts present in or occurring in content items of content repository 120 using a learned model, according to one embodiment. The learned model may be generated by a model trainer using an ensemble method, such as linear support vector classification, logistic regression, k-nearest neighbor, naïve Bayes, or stochastic gradient descent.

In some embodiments, the content processing module 160 uses large corpora (e.g. textbooks, Wikipedia, WordNet, ConceptNet, etc.) as basic training sets. Using the example of textbooks, it is possible to extract concepts from the table of contents such as section names, chapter names, and even the subsections within chapters. Additionally, the back of the book index may provide valuable nesting and hierarchy, exposed via common indentation structures, and simple tags such as "see also". Such structures can be captured via classifiers trained to ingest a trajectory, or subcomponent of the trajectory, and output a label as to the veracity of the trajectory in question. Accordingly, at 215, content processing module 160 extracts inheritance metadata from the content item, where possible. Inheritance metadata is derived from information provided in the content item itself that specifies an absolute location of concepts in the content item. Inheritance information takes advantage of the fact that most information in content repository 120 is organized in a particular sequence, such as more generic to more specific, simple to complex, etc. Note that not all type of content items have accessible inheritance metadata, but that textbooks, reference guides, etc., which can form a majority of content of content repository 120 typically do. For example, a textbook table of content specifies page numbers for chapters, sections, sub-sections, etc. in the content item, while its index specifies page numbers in which concepts occur in the content item. From the table of content and/or index of the content item, content processing module 160 derives inheritance information, that is a relative location of concepts in the content item. For example, from information in the index, content processing module 160 determines that two concepts occur on the same page. As another example, from information in the table of contents and/or from the index, it can be determined that a concept typically follows another concept, and so on.

At 220, content processing module 160 identifies associations between concepts for a plurality of concept categories. At 220, content processing module 160 develops a multi-dimensional semantic vector space (henceforth the semantic vector space) that encodes the relationships between concepts. Specifically, concepts which are related in important ways are mapped as proximate in the semantic vector space which concepts that are less related or unrelated to one another are mapped to be distant. When built across many concepts (typically tens of thousands to millions) across many text documents, this results in a semantic vector space with the desired characteristics.

In one embodiment, content processing module 160 identifies associations between concepts based on a determination that two concepts frequently appear in proximity to one another in content items are likely to be related. Accordingly, in one embodiment, the content processing module 160 identifies associations between concepts appearing in proximity to one another in content items of the content repository 120, such as concepts appearing on the same page or concepts appearing in the same section of two documents. In one embodiment, the content processing module 160 applies an apriori algorithm to identify concepts appearing in proximity to one another across multiple content items. Other algorithms identifying associations between concepts in the documents of the content repository 120 may alternatively be used.

In some embodiments, content processing module 160 identifies associations between concepts using the inheritance metadata extracted from content items in content repository 120. Using the inheritance metadata, content processing module 160 generates concept pairs, where concepts in a concept pair are related to each other based on their relative location to each other. Accordingly, a first concept is related to a second concept because inheritance metadata indicates that the first concept follows the second concept, perhaps over a number of content items in the content repository 120. As another example, a first concept is related to a second concept because inheritance metadata indicates that the first concept co-occurs with the second concept in the same page, or in the same sub-section, or in the same chapter, etc., perhaps over a number of content items in the content repository 120.

As an example, for a particular chapter (say, chapter 1) in a particular book in content repository 120, content processing module 160 assigns the following concepts: process of science, macromolecules, cell, membranes, energy, enzymes, cellular respiration, and photosynthesis.

Using the identified associations, at 230, content processing module 160 generates a concept map for each concept illustrating concepts related to a first concept in multiple domains. Concept map may indicate that concepts have one of the following relationships: a parent and child relationship in one (or more) domain(s) but no relationship in other domains and a sibling relationship in one (or more) domain (s) and no relationship in other domains. An example of a concept map for the concept "giraffe" is illustrated in FIG. 2B.

The process shown in FIG. 2A is repeated until concept maps are created for each concept present in content items in the content repository 120. Similarly, when new content is added to the content repository 120, the processing module 150 determines concepts occurring in these documents and creates and/or updates corresponding concept maps by the process shown in FIG. 2A. Further, as the learned model updates itself, concept maps are also updated.

Figure 2B:
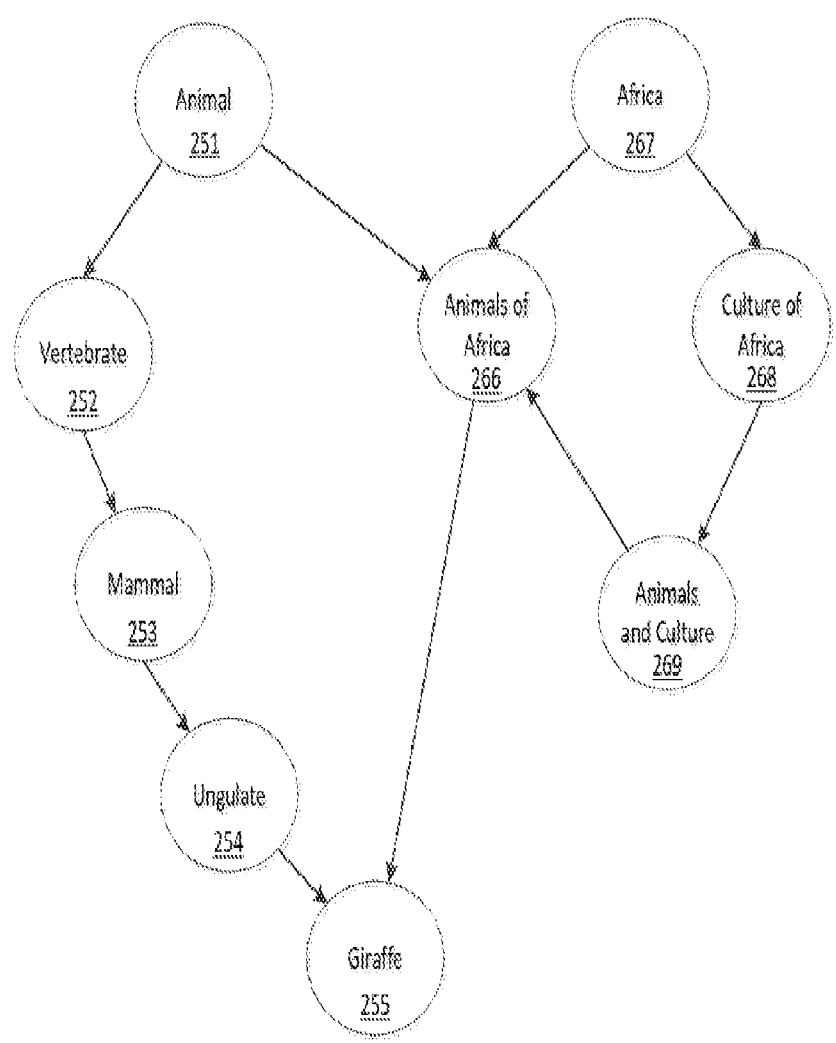
FIG. 2B is an example of a concept map in accordance with some implementations.

FIG. 2B provides an illustrative a concept map 250 that may result from operation of block 230. For a given concept node "giraffe" 255, the concept map illustrates several trajectories or paths of reaching it, where the concept is organized in (i.e., appears in) two different domains (here, animal 251 and Africa 267) that are contextually very different. The trajectories are based on hierarchical classifications. In the first trajectory, the vertebrate node 252 is a type of animal 251, a mammal 253 is a type of vertebrate 252, an ungulate 254 is a type of mammal 253, and a giraffe 255 is a type of ungulate 254. In the second trajectory, the base node is the content of Africa 267, and animals of Africa 266 is a subset of Africa 267, and giraffe 255 is a type of animal of Africa 266. In a third trajectory, the base node is the continent of Africa 267, culture of Africa 268 is a subset of Africa 267, animals and culture 269 is a subset of culture of Africa 268, animals of Africa 266 is a subset of animals and culture 269 and finally, giraffe 255 is a type of animal of Africa 266. The base nodes 251 and 267 can represent concepts from different domains or content entities. For example, the animal node 251 may represent a biology concept, while the Africa node 267 may represent a geography or anthropology concept. But, starting with either base node, which can be very distant from each other in a concept map, one can end up at the desired destination node of Giraffe 255.

Figure 2C:
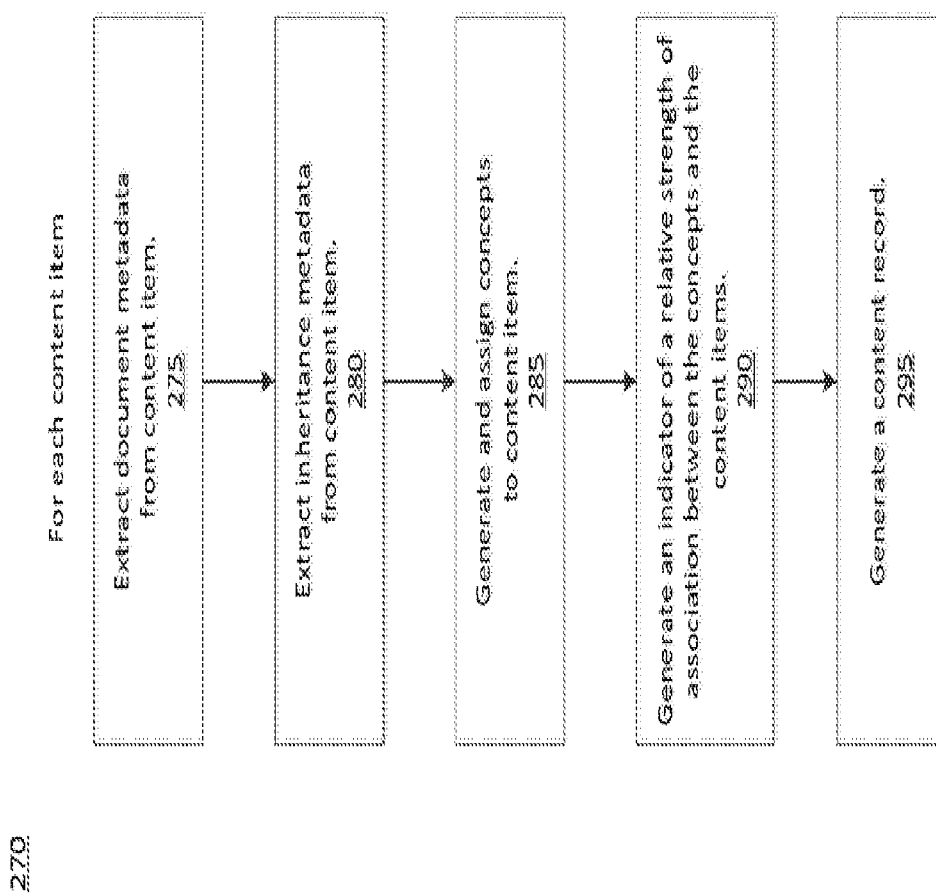
FIG. 2C is a flowchart illustrating a method of processing content in content repository 120 in accordance with some embodiments.

FIG. 2C is a flowchart illustrating a method 270 of processing content in content repository 120. Method 270 is performed, for example, by content processing module 160 of education engine 115. Steps in the method 270 that are not order-dependent may be reordered and steps may be combined or broken out.

At 275, content processing module 160 extracts document metadata from a content item in content repository 120. In some embodiments, document metadata includes elements as, title, author, description, keywords, file size, file type, language of content, publisher, release data, short description, cover page, and the like. As an example, for a particular book in content repository 120, extracted document metadata may include: "Title: Science 101: Biology", "Author: Ochoa, George", "Edition: 1"; "ISBN-13: 978-0060891350"; "ISBN-10: 0060891351"; "Series: Science 101"; "Publisher: Harper Perennial"; "Language: English"; "Date of Publication: Jun. 26, 2007"; "File type: Pdf"; "File Size: 3 GB".

At 280, content processing module 160 extracts inheritance metadata from the content item, where possible. Inheritance metadata is derived from information provided in the content item itself that specifies an absolute location of concepts in the content item. Inheritance information takes advantage of the fact that most information in content repository 120 is organized in a particular sequence, such as more generic to more specific, simple to complex, etc. Note that not all type of content items have accessible inheritance metadata, but that textbooks, reference guides, etc. typically do. For example, a textbook table of content specifies page numbers for chapters, sections, sub-sections, etc. in the content item, while its index specifies page numbers in which concepts occur in the content item.

From the table of content and/or index of the content item, content processing module 160 derives inheritance information, that is a relative location of concepts in the content item. For example, from information in the index, content processing module 160 determines that two concepts occur on the same page. As another example, from information in the table of contents and/or from the index, it can be determined that a concept typically follows another concept, and so on.

At 285, content processing module 160 generates and assigns concepts to content items using a learned model, according to one embodiment. The learned model may be generated by a model trainer using an ensemble method, such as linear support vector classification, logistic regression, k-nearest neighbor, naïve Bayes, or stochastic gradient descent. As an example, for a particular chapter (say, chapter 1) in a particular book in content repository 120, content processing module 160 assigns the following concepts: process of science, macromolecules, cell, membranes, energy, enzymes, cellular respiration, and photosynthesis.

In some embodiments, concepts generated by content processing module 160 are hierarchical in nature, and the hierarchy is utilized when assigning concepts to a particular content item. For example, if content processing module 160 assigns a child concept is to a document, the corresponding parent concept is automatically assigned.

In some embodiments, concepts generated by content processing module 160 are seeded by information extracted at block 210. For example, say at 210, content processing module 160 extracts an index and a table of contents for a book. The information in the index and the table of contents is then used by content processing module 160 as seeds to generate the concepts assigned to that book.

In some embodiments, content processing module 160 identifies associations between concepts. Using the identified associations, content processing module 160 generates concept pairs, where concepts in a concept pair are related to each other. In one embodiment, content processing module 160 identifies associations between concepts based on a determination that two concepts frequently appear in proximity to one another in content items are likely to be related. Accordingly, in one embodiment, the content processing module 160 identifies associations between concepts appearing in proximity to one another in content items of the content repository 120, such as concepts appearing on the same page or concepts appearing in the same section of two documents. In one embodiment, the content processing module 160 applies an apriori algorithm to identify concepts appearing in proximity to one another across multiple content items. Other algorithms identifying associations between concepts in the documents of the content repository 120 may alternatively be used.

In some embodiments, content processing module 160 identifies associations between concepts using the inheritance metadata extracted at 215. Using the inheritance metadata, content processing module 160 generates concept pairs, where concepts in a concept pair are related to each other based on their relative location to each other. Accordingly, a first concept is related to a second concept because inheritance metadata indicates that the first concept follows the second concept, perhaps over a number of content items in the content repository 120. As another example, a first concept is related to a second concept because inheritance metadata indicates that the first concept co-occurs with the second concept in the same page, or in the same sub-section, or in the same chapter, etc., perhaps over a number of content items in the content repository 120.

In some embodiments, for concepts assigned to a particular content item, at 290, content processing module 160 also optionally generates an indicator of a relative strength of association between the concepts and the particular content item. For example, for a first concept that is very strongly associated with the particular document, content processing module 160 may assign, say, a score of 0.99, while for a second concept that is only mildly associated with the particular content item, content processing module 160 may assign a score of 0.4.

In one embodiment, the content processing module 160 determines the indicators of relative strength (e.g., scores of 0 to 1) using one or more interestingness measures, such as support, confidence, lift, and conviction. The support supp (x) for a concept x is given by the probability P(x) of the concept occurring in a given document. The confidence conf(x→y) for a concept y occurring in a document given the occurrence of concept x in the document is defined by the conditional probability of y given x, or P(x and y)/P(x). The lift lift(x→y) for a concept y occurring in a document given the occurrence of concept x is given by the observed support for x and y in the document as a ratio of the expected support if x and y were independent concepts, or P(x and y)/[P(x)P(y)]. The conviction conv(x→y) is given by a ratio of the expected frequency of concept x occurring in a document without concept y (assuming x and y are independent concepts) to the observed frequency of x without y, or P(x)P(not y)/P(x and not y).

Figure 3:
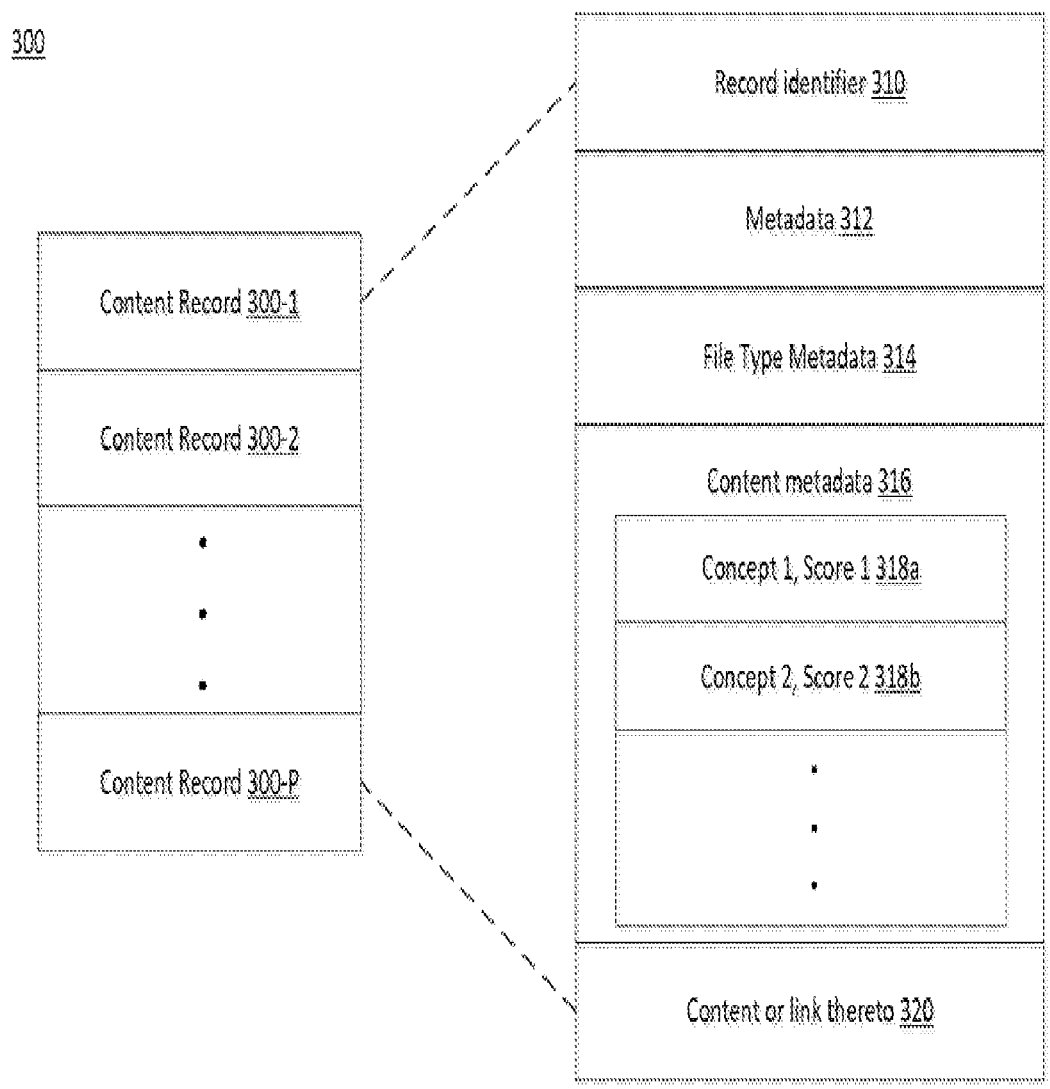
FIG. 3 depicts an example data structure for storing educational content and learning activity content in accordance with some implementations.

At 295, for each content item in the content repository 120, content processing module 160 generates a content record 300, which is discussed further with reference to FIG. 3. Concepts assigned at block 285 are stored as concept metadata 316.

The process shown in FIG. 2C is repeated until content records are created and concepts stored for content items in the content repository 120. Similarly, when new content is added to the content repository 120, the processing module 150 assigns concepts to these documents and creates corresponding content records by the process shown in FIG. 2C. Further, as the learned model updates itself, concepts stored in the content records are also updated.

FIG. 3 depicts an example data structure 300 for the content repository 120 for storing educational content and learning activity content in accordance with some implementations. Content repository 120 includes a plurality of content records 300-1 to 300-P, each of which corresponds to a discrete content unit. In some implementations, content repository 120 stores extremely large number of content records, such as in the millions, billions, etc. In some implementations, each content record 300 for a content unit includes: a unique record identifier 310 that identifies the particular content record; metadata 312 associated with the content, such as, author, title, keywords, date of creation, date of upload to education platform 110, a description, a file size, and so on, as extracted at block 210; type metadata 314 associated with the content that identifies a type or format of the content, as extracted at block 210; concept metadata 316 determined by content processing module 160 at block 220 and optionally, indicators 318 of relative strength of association of concepts to the content in the content record; and content 320 or a link thereto.

Referring to type metadata 314, the type or format of a content unit is that of digital media and may include, without limitation, text content, image content (e.g., a JPEG or GIF file), audio content, video content, hypertext protocol content, and so on, or any combination of these kinds of content. Content may also include instruction-bearing content, such as machine-readable program code, markup language content, script content, and so forth.

Content record 300 also includes content 320. Content 320 may refer to a book of chapters (e.g., an "eBook"), a chapter of a book, a section within a chapter of a book (such as, questions at the end of the chapter), an issue of a magazine, an entire music album, a song in an album, user-generated notes, etc. In some implementations, the content record 300 does not include the content 320, but instead includes a pointer or link to or other address of content 320, in which case the content itself can be stored outside of the content repository 120, e.g., on a third party server or repository (not shown).

Referring again to FIG. 1, educational platform 110 includes a user information repository 125, which stores a user record associated with each user (e.g., users 101a and 101b) of education system 100. FIG. 4 depicts an example data structure 400 for the user information repository 125 for storing user information for user 101 in some implementations. User information repository 125 includes a plurality of user records 400-1 to 400-P, each of which corresponds to a unique user 101.

A user record 400 may include: a unique record identifier 410 that identifies the particular user record; identification information 415 for the user, such as, the user's name, email address, address, mobile device number, etc.; educational biographical information 420; and historical access information 430 including records of user's activities on the educational platform 110.

Educational biographical information 420 may include historical and current biographical information, such as universities attended by the user, courses taken, grades in those courses, courses currently registered for, major(s) declared, degree(s) obtained, degree(s) user wishes to obtain, and so on. Educational biographical information 420 may also include a calendar of user's personal, social, and educational commitments, such as upcoming assignment deadlines, upcoming exam deadlines, etc.

Historical access information 430 indicates which content 320 (or associated content records 300 as identified by their unique content identifiers 310) in content repository 120 has been accessed by user 101. In some embodiments, historical access information 430 indicates content that has accessed by the user while performing a quest as discussed with reference to FIGS. 7A-C. Access information 430 may also indicate amount of time spent 424 by user 101 on each content, and optional timestamps 426 of time of access. Access information 430 may also indicate attributes of interaction 428 by user 101 with content 322. In some embodiments, attributes of interaction 428 indicates whether the user's activity was passive, active, or recall.

Passive activities include a user's passive interactions with content in content repository 120, such as, when a user reads a textbook. As another example, when content 322 is a video file, attributes of interaction 438 may indicate that the user 101 watched the video, skipped portions of the video, favorited the video, gave the video a favorable or an unfavorable rating, and so on.

Activities are defined as "active" when a user creates new own user generated content, such as, personal notes, highlights, citations, and other comments, asking questions when help is needed, solving problems, and connecting and exchanging feedback with peers, among others.

Recall activities tests a user against knowledge acquired from passive and active activities. In some cases, recall activities are used for evaluating student performance in the context of an educational course, and may include homework assignments, tests, quizzes, and the like. In other cases, users complete recall activities to study information learned from their passive activities, for example by using flashcards, solving problems provided in a textbook or other course materials, or accessing textbook solutions.

A user record 400 may further include a learning profile 440 for user 101. The determination of learning profile 440 by education platform 110 is described further with reference to FIG. 5. Learning profile 440 may indicate one or more preferred modes of learning for user 101 and may indicate preferences for: type of activity preferred (e.g., active, passive, or recall), type of content (e.g., video, lecture, book, etc.), duration of activity (short vs. long), and so on. For example, one user may learn better by watching videos, while another may learn better by reading text. In another example, one user may learn better if learning sessions are frequently interspersed with non-learning recreational sessions, while another may learn better with long undisturbed sessions. In another example, one user may learn better by repetition or refreshing of previously learned material, while another may prefer mostly or all new material. In yet another example, user 101 may have different preferred modes of learning for different subjects, courses, topics within a subject or course, or even concepts within a subject or course. In yet another example, user 101 may have different preferred modes of learning at different times. For example, at the beginning of an academic term, user 101 may prefer a first mode of learning (such as, a recall activity comprising refresh of material learned in a preceding class, use of a lot of exercises to learn new topics), and at the end of an academic term, user 101 may prefer a second mode of learning (such as, a recall activity comprising refresh of material learned in current class).

In some embodiments, learning profile 440 optionally includes a differential learning profile 450. The determination of differential learning profile 450 by education platform 110 is described further with reference to FIG. 5.

Figure 5:
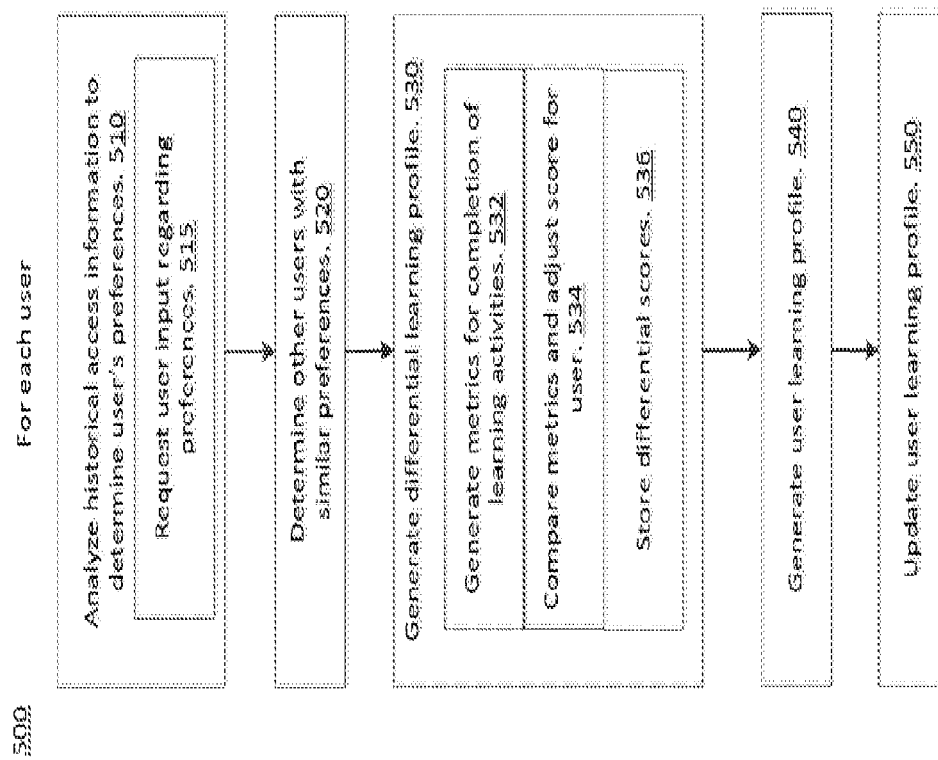
FIG. 5 is a flowchart illustrating a method 500 of determining a user learning profile in accordance with some embodiments.

FIG. 5 is a flowchart illustrating a method 500 of determining a user learning profile 440. Method 500 is performed, for example, by user learning profile module 170 of education engine 115. Steps in the method 500 that are not order-dependent may be reordered and steps may be combined or broken out.

In some implementations, learning profile module 170 generates a user learning profile 440 using a learned model, according to one embodiment. The learned model may be generated by a model trainer using an ensemble method, such as linear support vector classification, logistic regression, k-nearest neighbor, naïve Bayes, or stochastic gradient descent.

At 510, learning profile module 170 analyzes a user's historical access information 430 to determine the user's preferences. The learning profile module 170 analyzes the user's activities (e.g., active, passive, or recall), type of content rendered (e.g., video, lecture, book, etc.), duration of activities, etc., to determine the user's preferences.

Optionally, at 515, learning profile module 170 may optionally request user 101 to provide user input regarding that user's preferences. In some implementations, learning profile module 170 requests user 101 to provide user input if there is not enough information in user's historical access information 430, as may be the case for a new or relatively new user 101 of education platform 110.

At 520, learning profile module 170 uses the user's preferences from 510 to determine other user records with similar preferences. In some implementations, learning profile module 170 compares the user's preferences with other users' preferences, and interprets a match over a certain threshold between these preferences as meaning that users have similar preferences.

At 530, learning profile module 170 generates a differential learning profile 450 for user 101. The differential learning profile 450 provides a snapshot of how the user's learning compares with one or more other users with respect to a particular subject, topic, course, concept, etc.

At 532, for at least two users of platform 110, learning profile module 170 generates one or more metrics for completion of one or more sets of learning activities. Examples of metrics include: time taken to complete each learning activity individually; time taken to complete a particular set of learning activities in aggregate; completion velocity referring to whether the user started slow but then got faster (i.e., accelerated), or started fast but got slow (i.e., decelerated), or stayed the same (i.e., no change); outcome of recall activities in the set of learning activities; outcome of the set of learning activities in aggregate (e.g., student grade); and so on.

In one case, users for generating the differential learning profile 450 are selected based on overlap in learning activities with each other. Accordingly, differential learning profiles 450 are generated for users with overlap in learning activities. For example, say a first user 101a is enrolled (or was) enrolled in Bio 101. Accordingly, learning profile module 170 may generate a differential learning profile 450 for user 101a that indicates a difference between the user's learning and that of other users in Bio 101 based on all of the users performing the same activities, such as completing the same assignments, reading the same textbook chapters, and so on.

In another case, users for generating the differential learning profile 450 are selected based on overlap in learning objectives. Accordingly, differential learning profiles 450 are generated for users with overlap in learning objectives. For example, say a first user 101a is interested in a first job. Accordingly, learning profile module 170 may generate a differential learning profile 450 for user 101a that indicates a difference between the user's learning and that of other users who are interested in the same job.

At 534, learning profile module 170 compares the metrics generated at 532 and adjusts a differential score for user 101 accordingly. The score may be incremented when the metric comparison indicates that user 101 performed better than the other user(s) (or an average user), decremented when user 101 performed worse, and not adjusted when the performances were equivalent. The score represents a difference between the learning profile for user 101 and one other user (or average user). Learning profile module 170 may iteratively perform steps 532 and 534 until it determines n differential scores for user 101 representing the difference between the learning profile for user 101 and each other user (n–1) who has completed the or more sets of learning activities at 532, such as each other user in Bio 101.

At 536, learning profile module 170 stores the n differential scores for user 101 as the differential learning profile 450 for particular subject, topic, course, concept, etc. In the example above, the n differential scores for user 101 are stored in association with the course Bio 101.

At 540, learning profile module 170 uses the user's preferences (from 510), the preferences for other similar users (from 520), and the user's differential learning profile 450 to generate a learning profile for the user. Accordingly, learning profile module 170 can expand and/or refine the learning profile for the user using the preferences for other similar users. For example, if a first user has learning preferences A, B, and C that match with a second user who also has learning preferences A, B, and C, but also has a learning preference D, then learning profile module 170 infers that the first user also has learning preference D.

At 550, learning profile module 170 updates the user's learning profile as the user's access information 430 changes, as other similar users' access information 430 changes, as new similar users are added, and as older similar users are no longer considered similar. At 540, learning profile module 170 also updates the user's learning profile based on results of an application of the user's learning profile. As discussed further with reference to FIG. 8, the user's learning profile is used to present a playlist of learning activities to the user. In some implementations, the user's response to the playlist is stored as part of the historical access information 430 and is also used to update the user's learning profile.

The process shown in FIG. 5 is repeated until learning profiles are created and for each user record 400 in user information repository 125. Similarly, when new users access education platform 110 and corresponding new user records are added to the user information repository 125, the learning profile module 170 creates corresponding learning profiles. Further, as the learned model updates itself, learning profiles are also updated.

Figure 6A:
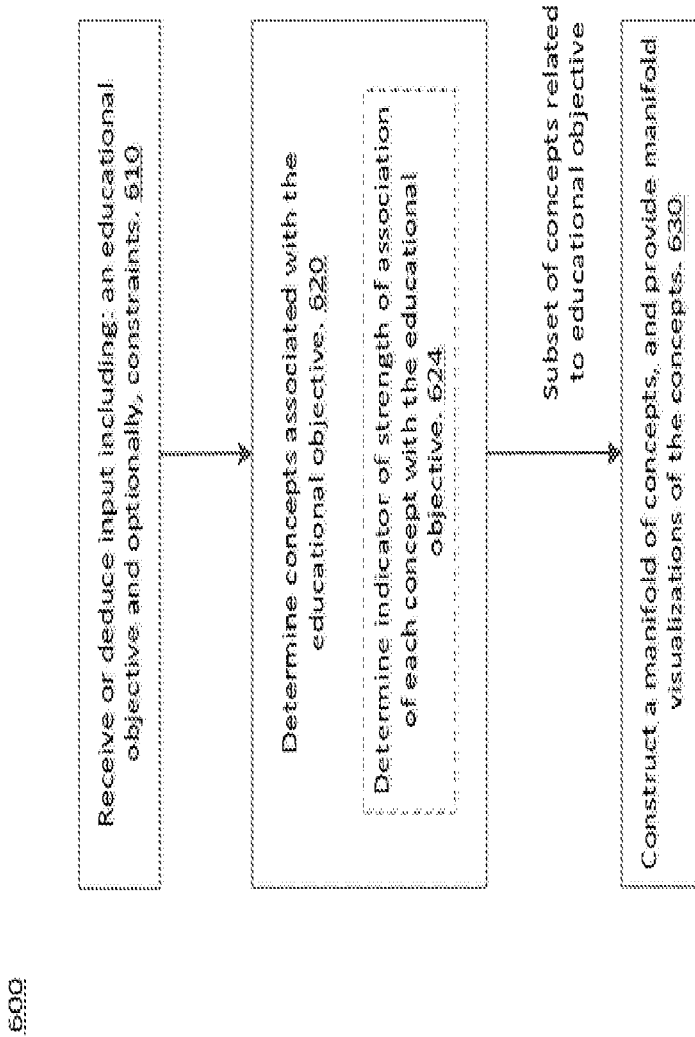
FIG. 6A is a flowchart illustrating a method for generating gamified personalized learning activities for a user in accordance with some embodiments.

FIG. 6A is a flowchart illustrating a method 600 of generating gamified personalized learning activities for a user. Method 600 is performed, for example, by gamification module 180 of education engine 115. Steps in the method 600 that are not order-dependent may be reordered and steps may be combined or broken out.

At 610, an input including at least an educational objective for a first user 101 is received. The input can be received from the first user 101, or from another user, such as, the user's professor, in natural language and may indicate an upcoming milestone, such as an exam, mid-term, assignment due date, or simply a user's desire to learn a topic or achieve a goal. In some embodiments, the educational objective is broader and encompasses obtaining an academic degree (e.g., B.Sc. in mathematics), or certification (e.g., professional certification for networking professionals), proficiency (e.g., proficiency in a programming language), or obtaining skills and experiences required for a particular job title, and so on. The educational objective includes a plurality of concepts, based on which the gamified personalized learning activities are developed, as discussed further with respect to block 620.

In some embodiments, input at 610 is explicitly provided, while in others, it can be deduced by gamification module 180. For example, gamification module 180 accesses a user's upcoming assignment and exam deadlines stored in educational biographical information 420 in user information repository 125 to determine the educational objective. For example, the user's upcoming assignment and exam deadlines may indicate that the user's Bio 101 mid-term is in 12 hours, an English 101 paper is due in 24 hours, or that the user may wish to refresh cell division in order to be prepared for an upcoming class in 30 minutes.

In some embodiments, input at 610 further includes additional information, such as, information regarding constraints on the gamification. One possible constraint is a time constraint. Accordingly, a finite duration of time for completion of the educational objective may be explicitly provided to or deduced by gamification module 180. An example of an input including educational objective and time constraint is: "I want to learn about cell division in 30 minutes." Other possible constraints are rules that are to be applied to an eventual quest, as discussed further below in reference to FIGS. 7A-C. An example of a rule may be the minimum or maximum number of users that can participate in the quest.

At 620, gamification module 180 determines a plurality of concepts associated with the educational objective. For example, the educational objective "Bio 101 mid-term" may indicate the following concepts: process of science, macromolecules, cell, membranes, energy, and enzymes.

In some implementations, gamification module 180 determines the one or more concepts belonging to the educational objective using a concept map, e.g., as generated at block 230 of FIG. 2A.

In addition, or in the alternative, in some implementations, gamification module 180 determines the one or more concepts belonging to the educational objective based at least in part on a syllabus, course textbook, handouts, and other educational content associated directly with a student course, e.g., Bio 101 mid-term in the previous example. As an example, the course syllabus for Bio 101 may indicate that the mid-term covers chapters 1, 2, and half of chapter 3 of a particular textbook. Accordingly, gamification module 180 determines the one or more concepts belonging to the educational objective of "Bio 101 mid-term" as the concepts covered by chapters 1, 2, and half of chapter 3 of the course textbook. Each of the content items mentioned here, such as, the syllabus, course textbook, handouts, etc. has its own content record 300.

In some implementations, at 624, gamification module 180 optionally computes an indicator of a relative strength of association between the concepts and educational objective. For example, for a first concept that is very strongly associated with the gamification module 180, gamification module 180 may assign, say, a score of 0.99, while for a second concept that is only mildly associated with the particular content item, gamification module 180 may assign a score of 0.4.

Result of block 620 is a subset of concepts from the large set of concepts determined at block 210. At 630, gamification module 180 provides a manifold visualization that provides visual information to the user of how many concepts are associated with their educational objective. In the context of the education learning digital platform 110, a typical manifold visualization is constructed from a knowledge library or a library of textbooks published by education publishers, and as may be stored in content repository 120. In some embodiments, the knowledge library stored in content repository 120 represents a repository of organized and curated content, which is processed according to method 200 illustrated in FIG. 2A, resulting in a large number of distinct concepts indexed with related content across the entire library. The visualization at block 630 provides a user with immediate feedback as to the number of highlighted concepts as well as their respective mapping between themselves and within the rest of the manifold, providing support for several gamification modes of discovery and consumption. In some embodiments, the manifold visualization is three dimensional.

Figure 6B:
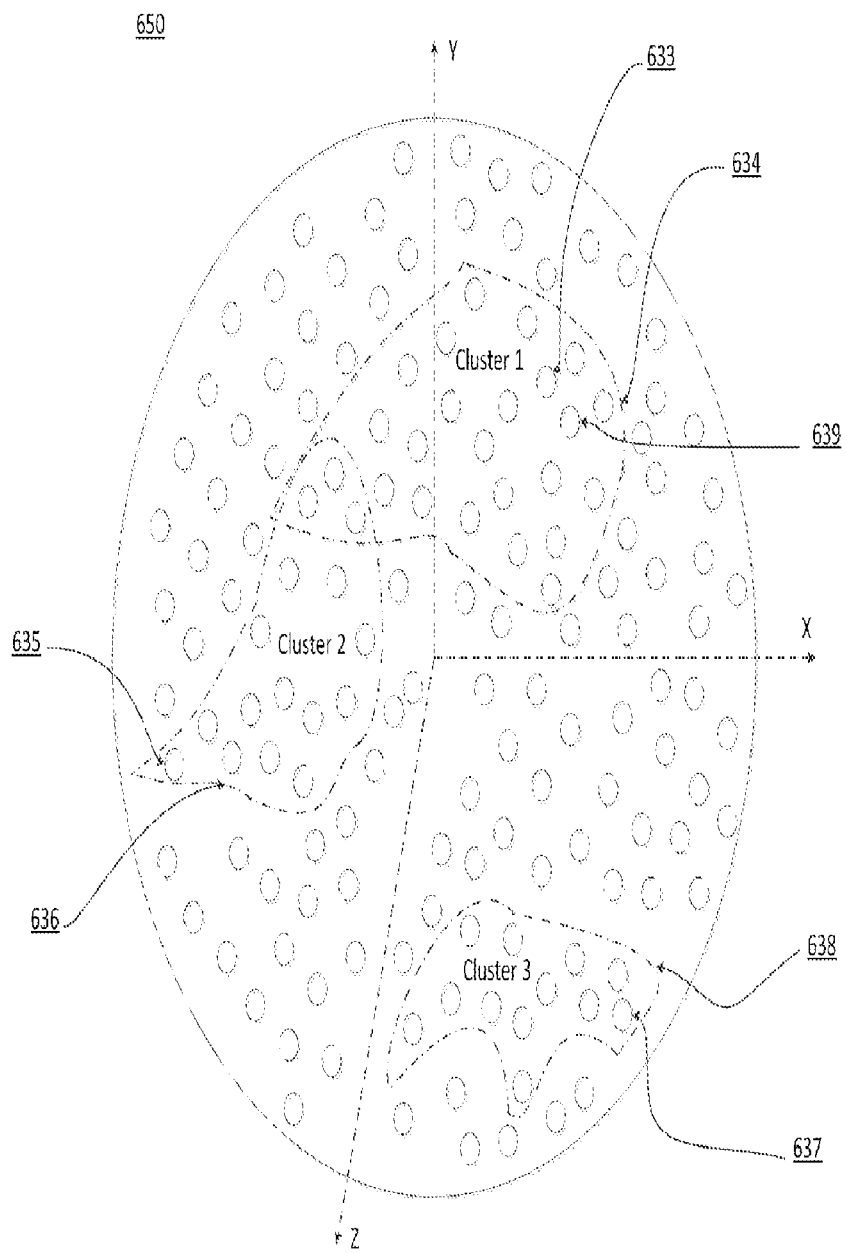
FIG. 6B is an exemplary manifold.

FIG. 6B illustrate example manifold visualization 650 that may be generated gamification module 180 at block 630. The manifold visualization 650 is a three dimensional construction—here, a sphere. The sphere is populated by concept nodes, where the concepts are individually mapped into an xyz space. Proximity of nodes in the xyz space is based on some relationship between the associated concepts. Accordingly, related concepts occur closer together in the xyz space. Manifold visualization 650 contains a large number of nodes, including nodes 635, 633, 639, and 637.

In the manifold visualization 650, nodes are clustered or grouped based on affinities. Manifold visualization 650 illustrates several clusters of nodes, such as clusters 636, 634 and 638. As shown in FIG. 6B, there can be overlap in the clusters, such as clusters 634 and 636. Overlap of clusters means that those clusters share nodes. Any number of visualization aids may be useful in illustrating the clusters, such as different colors for different clusters, highlighting, etc.

One type of affinity is domains. For example, nodes in cluster 634 are organized around a first domain, say domain "animal" 251, whereas nodes in cluster 636 are organized around a second domain, say domain "Africa" 267. Accordingly, every concept related to domain "animal" 251 is included in cluster 634, while every concept related to domain "Africa" 267 is included in cluster 636. The intersection of clusters 636 and 634 is due to both clusters containing the same (as shown, three) nodes.

Another type of affinity is documents. In some embodiments, the manifold 650 includes all concepts in a particular set of documents, such as, a set of textbooks. Then, a first cluster of nodes would include concepts in a first document, a second cluster of nodes would include concepts in a second document, and so on.

Another type of affinity is courses. Accordingly, in some embodiments, the manifold 650 includes all concepts in a particular set of courses, such as, a set of MOOCs. Then, a first cluster of nodes would include concepts in a first MOOC, a second cluster of nodes would include concepts in a second MOOC, and so on.

Another type of affinity is job skills. Accordingly, in some embodiments, the manifold 650 includes all skill concepts in a set of job descriptions. Then, a first cluster of nodes would include concepts in a first job description, a second cluster of nodes would include concepts in a second job description, and so on.

Another type of affinity is training documents. Accordingly, in some embodiments, the manifold 650 includes all concepts in a set of training documents, such as cooking videos. Then, a first cluster of nodes would include concepts in a first cooking video, a second cluster of nodes would include concepts in a second cooking video, and so on.

The clusters are a useful aide for a user 101 to explore the manifold and concepts therein. In an exploration mode, a user 101 may choose to select any number of a nodes in a cluster. For example, if the user 101 is interested in learning about animals, the user can visualize all nodes in cluster 634 and select one or more of the nodes. In some embodiments, each node includes a marker to a set of PAR activities. In exploring a first node, say node 633 for "giraffe" the user 101 may then explore the associated PAR activities. In next exploring a proximal node 639, the user 101 may discover information and associated PAR activities for an animal that the user may not be familiar with. In this way, a user's learning is improved.

A number of user activities are possible with the visualization 650. For example, the user 101 may be able to zoom in or out, rotate the three-dimensional space (e.g., sphere), perform searches (e.g., search for a term "giraffe"), and so on. The various clusters may be illustrated in different colors to make it easier for the user 101 to identify information that is closely related versus information that is not.

Figure 7A:
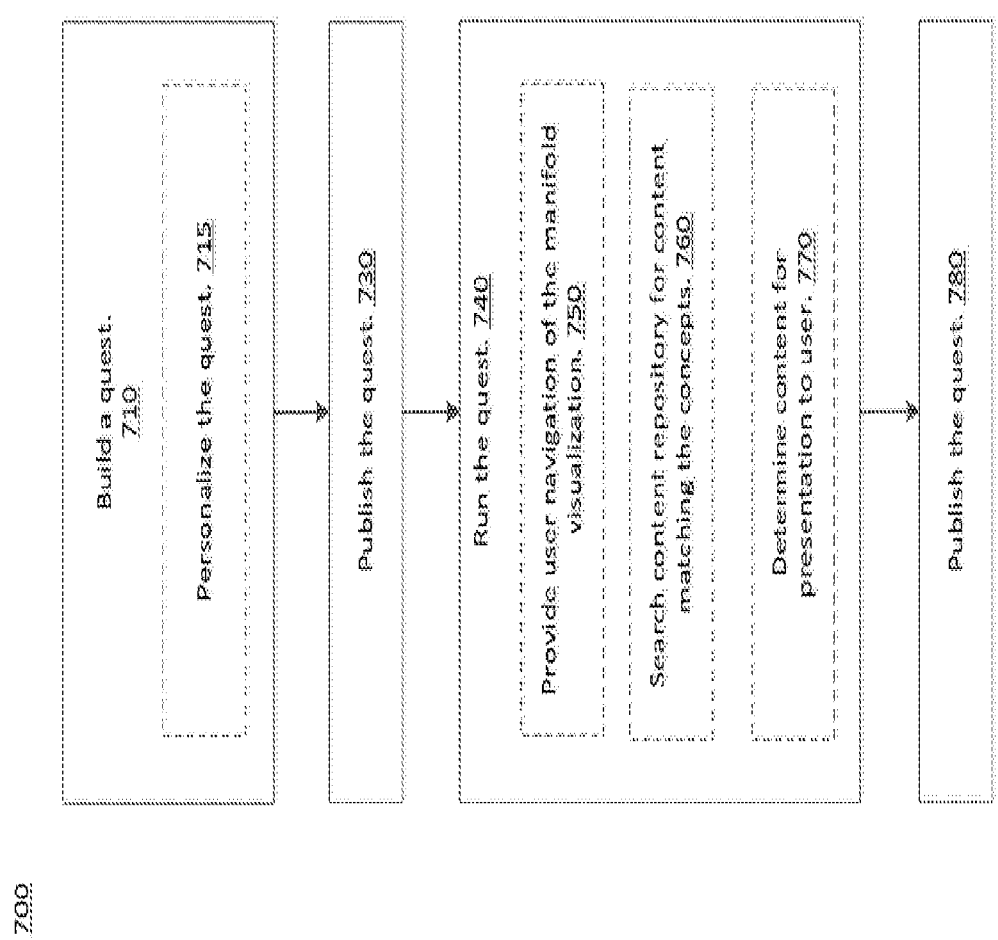
FIG. 7A is a flowchart illustrating a method generating a quest of gamified personalized learning quest for one or more users in accordance with some embodiments.

FIG. 7A is a flowchart illustrating a method 700 of generating a quest of gamified personalized learning quest for one or more users. Method 700 is performed, for example, by gamification module 180 of education engine 115. Steps in the method 700 that are not order-dependent may be reordered and steps may be combined or broken out.

As discussed further below, gamification module 180 constructs paths that highlights the specific nodes (each node corresponding to a particular concept) that are associated to a primary quest, along with any other nodes that may added as secondary quests based on properties of the quest.

Figure 7B:
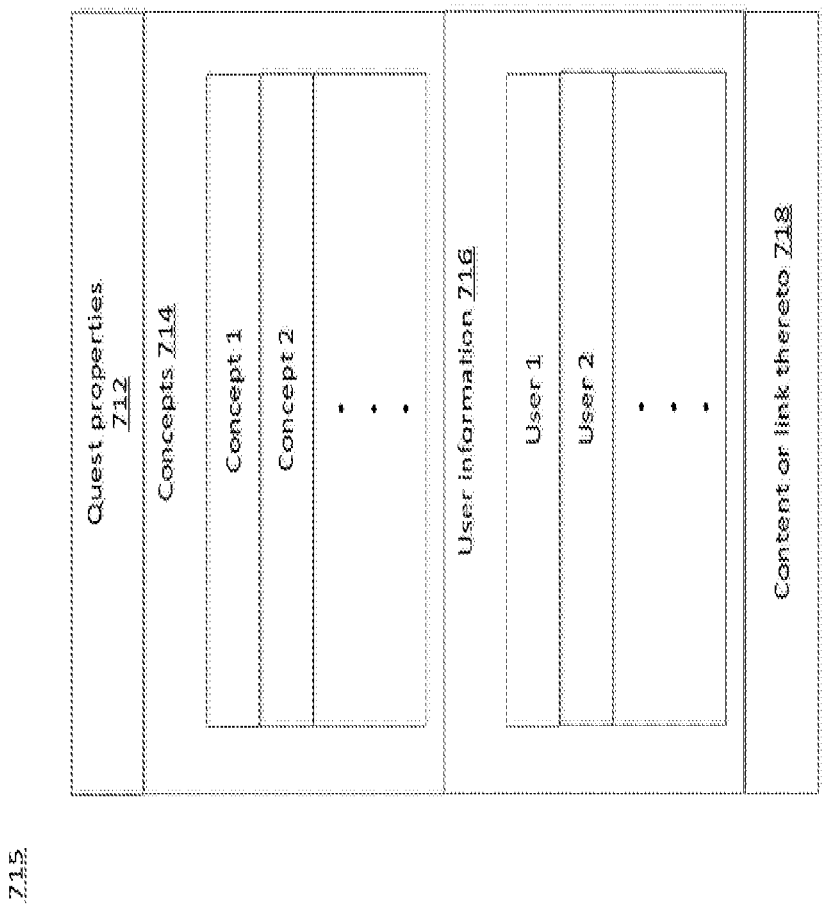
FIG. 7B illustrates a data structure for a quest.
Figure 7C:
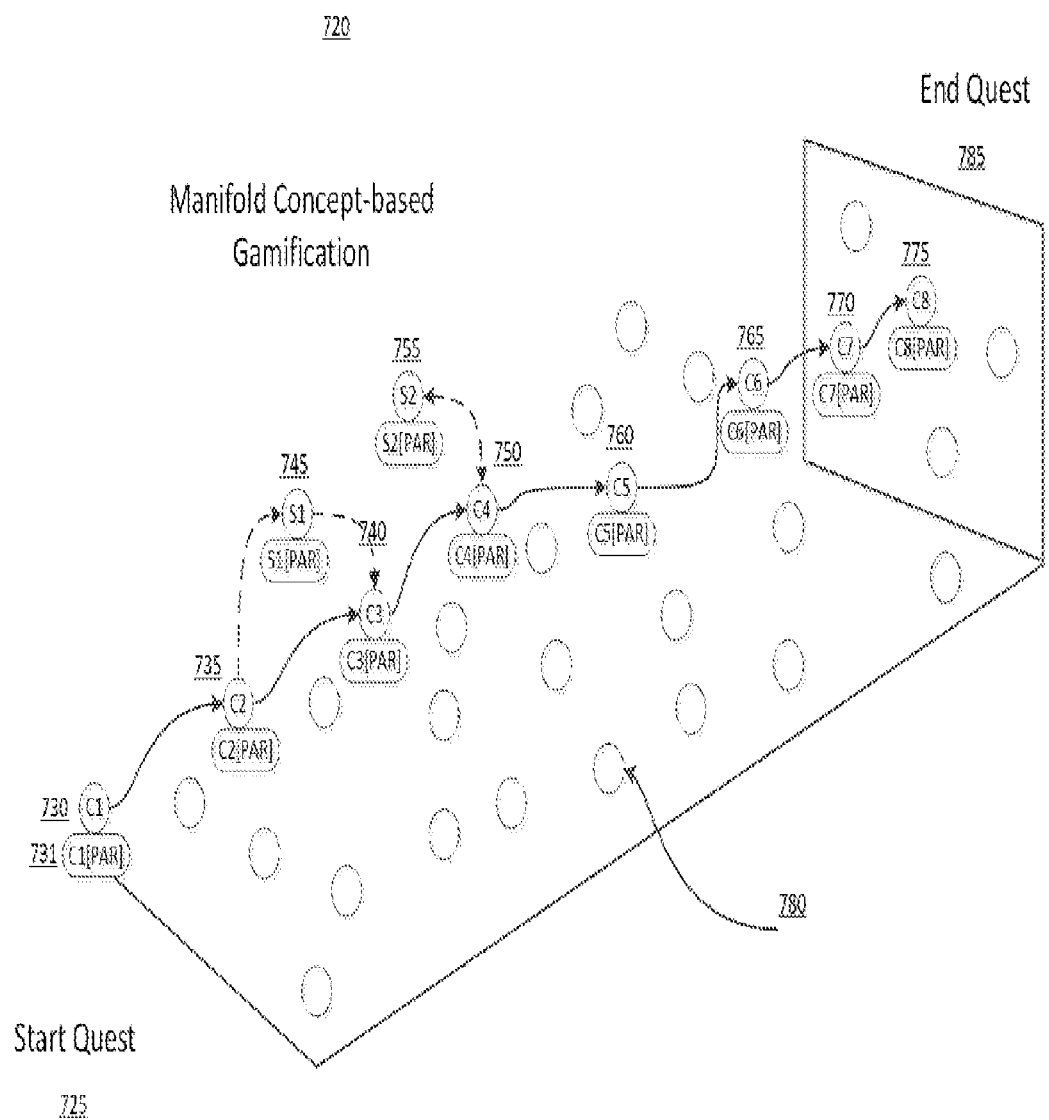
FIG. 7C is an exemplary user interface for a quest.

At block 710, gamification module 180 builds a quest 715, which is discussed further with reference to FIGS. 7B and 7C. A quest is defined by a set of properties and rules that govern how the quest is built and run. In some embodiments, a quest is a summation of concepts that a user must complete over time in order to complete the quest. FIG. 6A describes how an educational objective (such as, an academic degree, job title, qualification, certification, etc.) can all be deconstructed into concepts which can then be mapped out into a version of manifold. At 710, gamification module 180 constructs the quest from its defined rules and applies them within the constructed manifold (at block 630), highlighting the quest's nodes (each node corresponding to a concept), paths, start, end, and any other information that is relevant to the quest.

In some embodiments, a quest can be expressed as a summation of nodes, and has a start and an end and one more paths to connect the start concept with the end concept, with a series of primary nodes, and adjacent secondary nodes, in between. A quest may correspond to a particular objective, such as a user is learning a new skill, registered to a course, seeking a particular degree, applying to a new job, simply exploring a topic, and so on. As discussed, each concept node has its own set of indexed PAR activities.

In some embodiments, the quest is presented in a manner so as to maintain users' interest and motivate them to complete the quest. For example, one quest may be presented as a simulation of space, in which a user may journey from an edge of the universe (a starting node of the quest) to the center of the universe (an end point of the quest). As another example, a quest may be presented as a video game quest, and the user may be prompted to unlock new missions with corresponding one or more concepts as the user progresses.

A quest may also provide other types of gamification. For example, a quest may focus on speed and encourage a user to work speedily to travel within the manifest or complete the quest. A quest may focus on encouraging a user to explore many concepts and thus, how much a user can learn. A quest interface may further provide one or more user interface features to assist with gamification, such as, real-time visualization of concept nodes, zoom in/out/rotation, highlighting the quest pathway within the manifold, may display multiple open quests, or may help a user discover new quests, and so on. Visually, a quest can be run through a manifold representation, through a cluster within a manifold (e.g., clusters of concepts based on a domain), or through any other 3D representation.

FIG. 7B depicts a block diagram for an example data structure 715 that may be used to generate a quest 715 in accordance with some implementations. In some implementations, each quest 715 has corresponding: quest properties 712; a plurality of concepts 714 that are part of the quest, such as start node, end node, primary nodes, secondary nodes, and so on; user information 716 for one or more users participating in the quest 715; and content 718 or a link thereto. In some implementations, quest properties 712 include one or more of: (i) type of quest, such as: free-form exploration, time-based competition, qualitative (in which a quality of completion of PAR activities of the nodes in the quest is important), quantitative (in which a number of completion of PAR activities of the nodes in the quest is important), and so on, (ii) what the dataset is underlying the quest, that is whether the quest is based on entire content library 120, or certain clusters (e.g., domains, products, certifications, courses, degrees, jobs, etc.) therein, (iii) what is the user mode, that is whether is a single-user or multi-user, or whether the quest is collaborative or competitive, etc., (iv) goal(s) of the quest, such as awards, prizes, etc., (v) whether the quest is public or private, (vi) timing of quest, such as duration, when to start, etc., (vii) access privileges and user roles, indicating which users or user types (based e.g., on user profile) can join and users' roles (e.g., viewers, players, masters, etc.), (viii) rules associated with the quest, and so on.

At block 715, optionally, gamification module 180 personalizes the quest for each user. In some implementations, personalization includes adapting the quest based on at least the user record of the user participating in the quest. For instance, a user's learning profile 440 may be used to determine which concepts are familiar to the user and which are new. Familiar concepts may then be visualized differently in the quest from the concepts that are new to the user. Accordingly, when multiple users are participating in a quest, the quest is personalized for each user.

In multi-user quests, where users can see the location and/or progress of other users within the quest, the nodes (of concepts) within the quest can be highlighted differently if a node/concept is new (has to be learnt), learned recently (small decay) or learned years ago (large decay) based on a particular user's learning profile 440 and completed activities therein personalized PAR activities. For example, this can be used to control the progression of users along a quest differently based on their respective learning profile. For example, based on the quest properties, a user encountering a new concept may not be allowed to skip that concept, whereas a user encountering a recently learned concept may be allowed to skip it, or might be presented with a recall activity, and so on. Thus, while multiple users are on the same quest, they might be taking different journeys, and even for a shared concept, performing very different PAR activities. A useful analogy for personalization could be made with a GPS system calculating multiple driving routes between the same starting and ending points (Quest).

FIG. 7C illustrates a quest 720 that is presented to a user 101. The quest 720 includes a conditional path from start to end. The "quest mode" defines a path from a starting point 725 to an end point 785 within an entire manifold, a particular cluster, or within two or more clusters. The quest 720 starts with a primary node 730 for concept Cl, which has associated PAR activities 731.

In FIG. 7C, a number of concepts (have been highlighted to form a particular path within the manifold data visualization, mapping a path from the start/outer edge to the end/center of the manifold. Concepts 735, 740, 750, 760, 765, 770, and 775 are primary concept nodes and are part of the primary quest or goal, which needs to be accessed and completed by a user in order to progress towards completing the primary quest.

In some implementations, each node has associated therewith activities (e.g., activities 731 associated with node 730) that may need to be completed by the user in order to proceed in the quest. The activities, collectively referred to hereafter as PAR activities, may be one of recall activities, active activities, and passive activities. The definition of completion of an activity may vary depending on rules associated with the quest, the nature of the activity, etc. For example, a rule, provided at block 610, may specify that a user must obtain a score of 75% in each recall activity. In some implementations, the activities are linked to each corresponding highlighted concept to track and rate the users accessing them, providing the data required to progress from one highlighted concept to the next towards the final concept or "end quest".

In some implementations, the quest 720 includes concepts t714 hat may need to be completed by the user in a particular order to proceed in the quest as per ordering rules. These ordering rules may form a part of the rules that are included in the quest properties 712 and specify an order in which the various primary quest concepts must be explored by the users. In some embodiments, the exploration order of the primary quest concepts may be either "very strict" or "less strict". If the order is "very strict", the "primary quest" concepts must be explored in the order specified in the quest (as illustrated in FIG. 7C with solid arrows), as the concepts may build on each other. As such, the user 101 may be unable to change the order of exploration or skip primary quest concepts. If the order is "less strict", the user 101 may have rights to change the order, skip concepts, and so on.

As illustrated in FIG. 7C, in addition to primary quest concepts that must be completed, the quest includes secondary quest concepts 745 and 755 that are determined by gamification module 180 at block 620 to be proximal or closely related to the primary quest concepts and that a user may optionally wish to complete before proceeding. The quest may further include exploratory concepts, such as concept 780, that are distant to the primary quest concepts. Accordingly, gamification module 180 constructs the paths that highlights the specific concepts that are associated to a primary quest, along with any other concepts that may added as secondary quests.

Not illustrated in FIG. 7C, in some embodiments, in addition to the primary quest and the secondary quests, a user may engage in free exploration of concepts in the manifold visualization. Such free-form exploration may be beneficial to the user for understanding related concepts to concepts in the quest.

At block 730, education platform 110 publishes the quest, so that other users may join the quest. The publication of the quest other users joining it may depend on rules associated with the quest. For instance, a private quest may be only visible to a certain set of users, such as students enrolled in a particular course. Other quests may allow users to invite other users, and so on. In some embodiments, as new users join the quest, the view of the quest they see is personalized based on their respective user profiles.

At block 740, education platform 110 runs the quest with active registered user(s) operating within the manifold constructed at block 630. As discussed above, a manifold is the clusterization of nodes (of concepts) within at least a three-dimensional space, as identified and/or constructed by content processing module 160 (as discussed with reference to FIG. 6A). As an analogy, a manifold is like a galaxy, and the stars within the galaxy are the nodes within the manifold. A quest represents the journey or path that a user is to follow to travel between two points within the concept-based manifold, based on the quest properties 714. A starting point of the quest can be at the outer edge of the manifold, or anywhere within the manifold. An end point of the quest can be at the center of the manifold, or anywhere else. Regardless, the journey is defined by the primary nodes, and PAR activities, between the start point and end point, like a GPS providing driving directions.

As the users progress through the nodes in quest 720, gamification engine 170 captures the users' activities with respect to each concept displayed in the quest and processes the outcomes of the quest. The education platform 110 keeps running the quest until it gets completed, as governed by its rules and properties, at which time it terminates the quests, i.e. unpublishes it. Rules, for example, as provided at block 610, may govern how to progress from one concept to another within the quest as well as a mechanism to rate that progress overtime.

In some embodiments, in order to successfully move on from one concept in the quest to another, a set of defined tasks and activities may be required for a user to complete. These activities may request the user to access the material referred by the concept in activities that demonstrate access, interaction and/or assessment. Rules can be applied to a single user or can be applied to a group of users, i.e. two or more, to provide a collaborative or competitive mode. The rating calculated for completing a node/concept by a user, or group of users, is a factor of time, i.e. how long did it take to complete it, as well as qualitative, i.e. how well was it completed.

Concepts for the quest are determined by gamification module 180 as described in method 600 of FIG. 6A. In some embodiments, when multiple users are participating in the quest, gamification module 180 may distribute concepts among the users. This allocation may be based on the users' learning profile, the educational objective, and the time constraints. For example, if the effective time for completion is short, and the educational objective is a shared project (e.g., a programming assignment), then gamification module 180 may allocate concepts based on the users' relative strengths. Accordingly, each user may be presented quests corresponding to concepts that the user is already strong in. In other quests, all users participating in the quest may see at least the same primary quest concepts. However, as each user may explore the manifold in a different way, and by way of example, explore different secondary quests, each may experience the quest very differently from each other.

At 750, for each user participating in the quest, in response to user input, gamification module 180 provides user navigation of the manifold visualization(s), such as manifold 650. For example, a user may select, e.g., by pointing and clicking their mouse, an individual point in the manifold visualization. The user may perform other navigational tasks, such as zooming in or out, pivoting within, looking to the left, right, top, bottom, etc. of a selected point within the manifold visualization, and so on. In some embodiments, at 750, navigation is facilitated by providing user interface features to a user. For example, an interface feature may be titled "neighbors" (or equivalent), which when selected by a user, highlights the closest neighbors to a particular concept. Another interface feature may provide a search bar, so as to receive textual input from the user. Yet another interface feature may enable the user to view the most relevant concept pairs. Yet another interface feature may enable the user to filter the subset of concepts that is the result of block 620.

At 760, in response to user selection of a particular node (e.g., giraffe node), gamification module 180 searches content repository 120 for PAR content that matches at least the selected concept. As discussed above with reference to FIGS. 2 and 3, concept metadata 316 is generated and stored for each content in content repository 120. At 760, gamification module 180 searches content repository 120 for content records that include the concept (e.g., giraffe) in their concept metadata 216. Result of the search at 760 returns a first subset of content records in content repository 120. In one case, the result of the search 760 is a list of record ids 310 for the first subset of records.

At 770, gamification module 180 determines educational content for presentation to the user, such that the educational content matches the user's educational objective. In some embodiments the educational content includes one or more PAR activities.

In some embodiments, gamification module 180 filters the result of block 760. As an example, say the result at 760 is 100 content items. In some embodiments, all 100 content items are presented the user for discovery of content related to their educational objective and selected concept. In some embodiments, a subset of the 100 content items is presented in response to user provided filters. For example, the user may provide input indicating that they only wish to see certain types of content items, such as, only recall activities, or content authored by a particular author, and so on. In some embodiments, a subset of the 100 content items is presented by gamification module 180 based on a level of match between the user's course syllabus (and/or other course materials). For example, a subset of the 100 content items may not be selected for presentation to the user based on it matching content already familiar to the user. The idea behind such filtering by gamification module 180 is that by presenting new content to the user, the user's understanding of the concept becomes stronger. In doing so, the gamification module 180 may utilize the user learning profile to understand how the user learns. In some embodiments, a subset of the 100 content items is presented by gamification module based on attributes of client device. For example, if the user 101 is using a mobile device versus a laptop, the subset of the 100 content items is selected are those that are optimized for being rendered on a mobile device.

In some embodiments, the subset of the 100 content items include both items that have previously been accessed by user 101 and new items that have not previously been accessed by user 101, as indicated by user's historical access information 430. The ratio of previously accessed content and new content may be based on the user's learning profile. For example, if the user's learning profile indicates that the user learns better by repetition, then more previously accessed information may be presented.

Figure 8:
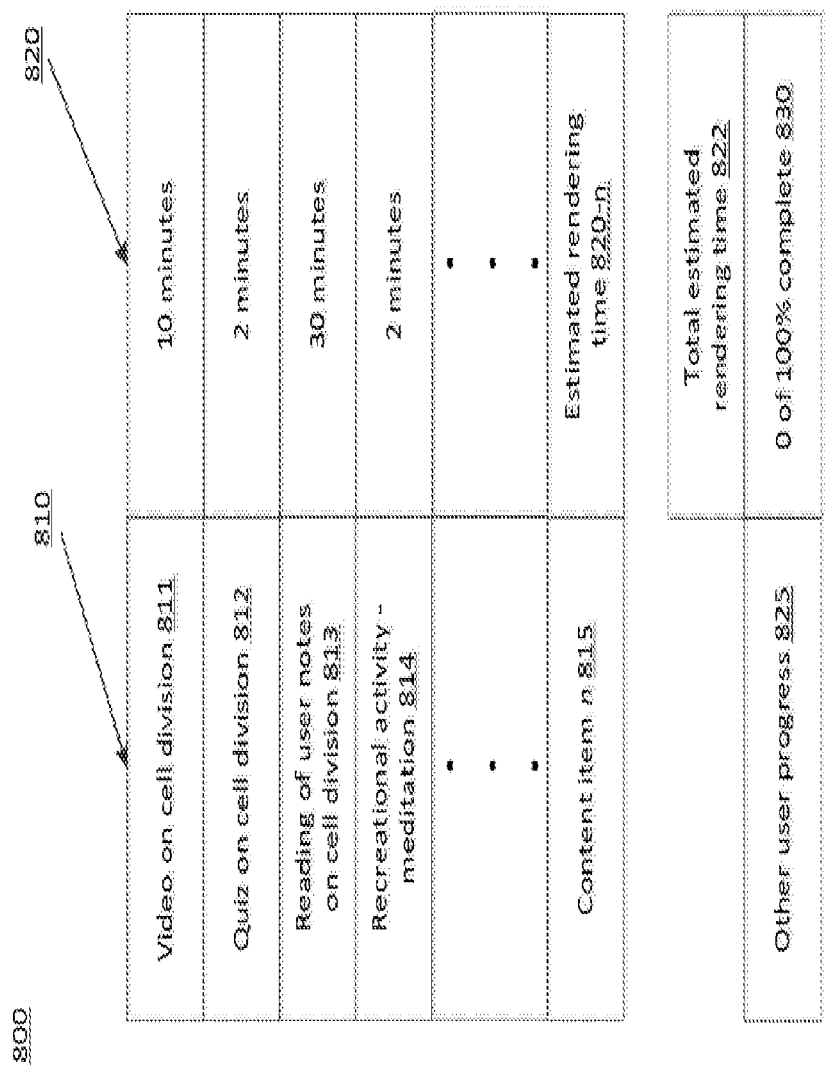
FIG. 8 is an exemplary user interface for activities that a user may need to complete to progress from one node in the quest to another.

In some embodiments, optionally at 770, gamification module 180 also selects a plurality of non-educational relaxation activities as part of the subset of the 100 content items, such as, video games, meditation, music, etc., designed to help the user 101 get necessary breaks so that the user 101 may more effectively retain the educational content in the plurality of educational content items. In some implementations, the non-educational relaxation activities may have respective content records 300 and are stored in content repository 120. FIG. 8 illustrates a user interface for providing content related to a particular concept, according to some implementations.

As part of running the quest at block 740, gamification module 180 tracks rendering of the content files associated with the concepts by user 101 in real-time. In some embodiments, gamification module 180 presents a progress tracker to user 101. The progress tracker may be in the form of a slider, a voice notification, etc. In some implementations, the progress tracker indicates how a particular user is doing compared to one or more other users participating in the quest, thereby encouraging competition or collaboration, as the case may be.

The process continues until at block 780, gamification module 180 terminates the quest once one or more of the users have completed at least the primary quest concepts. In some embodiments, at 780, after at least the primary quest concepts have been explored by user 101, and/or after the time in the time constraint (received at 610) has passed, gamification module 180 determines if the educational objective (received at 610) has been met. At 780, gamification module 180 may update the user's learning profile. Accordingly, if the user 101 achieved their educational objective, gamification module 180 may update the user's learning profile 440 to indicate preference for types of content rendered, etc.

FIG. 8 illustrates a user interface 800 for presenting a playlist 810 of content related to a particular concept in the quest to a user 101 according to some embodiments. As illustrated, the playlist 810 includes a list of n content items. One or more of the content items of the playlist 810 may be streamed to the client device 130 or may be downloaded to the client device 130 in the order shown. Accordingly, content item 811 is rendered first, followed by content item 812, and so on. The order of rendering of content items in the ordered playlist 810 may be very strict or less strict, as specified by quest properties 812.

As illustrated in FIG. 8, the content items 810 include content items of differing formats. As an example, content item 811 is a video file, content item 813 may be a word document, and so on. Further, content items 810 include content items that reflect differing types of user interactions. As an example, content item 811 is a passive activity involving the user watching a video, content item 812 is a recall activity involving the user doing a quiz, content item 814 is a recreational activity designed to help the student relax.

In some embodiments, as user 101 renders a content item (say content item 811), the interface 800 is updated so as to show an updated ordered list 810 containing items 812-815, an updated total estimated rendering time 822 for rendering items 812-815, and an updated progress tracker 830 (e.g., 10% of 100% complete).

Also shown in FIG. 8 is a progress tracker 830. Here, as the user has not started rendering the playlist, the progress tracker 830 indicates 0% completion. The interface 800 may further provide status or progress tracking information 825 for other users in the quest. The interface 800 may further present other useful information to user 101, such as (optionally) individual times 820 for rendering each content item in ordered playlist 810 individually, metadata (not shown) about the each content item in ordered list 810, a preview (not shown) of each content item in ordered list 810, a thumbnail (not shown) for each content item in ordered playlist 810, and the like. In addition, or in the alternative, interface 800 may further show user 101 social information related to one or more content items in ordered playlist 710.

For example, interface 800 may further show user 101a that a user 101b who is also participating in the quest is also rendering item 812 concurrently to user 101a, or recently rendered item 812. Interface 800 may further allow communication with user 101b, thus enabling user 101a to e.g., ask questions, discuss concepts, etc. with user 101b.

Figure 9:
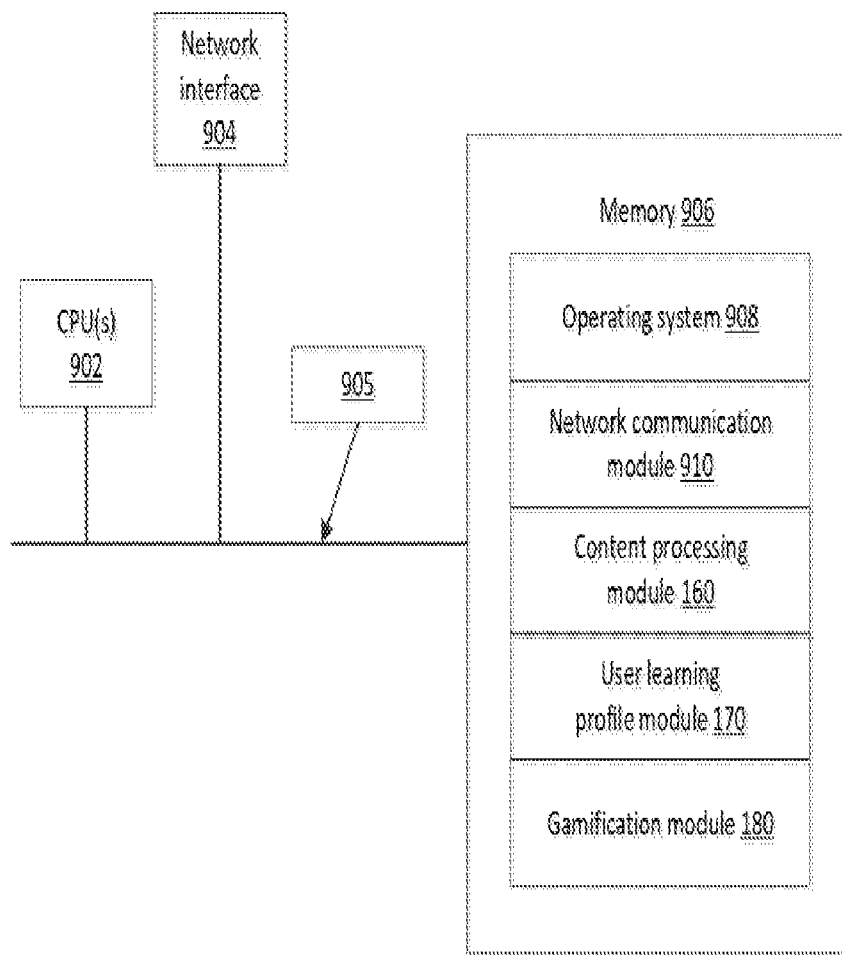
FIG. 9 is a block diagram of a server system 900 in accordance with some embodiments.

FIG. 9 is a block diagram of a server system 900 in accordance with some embodiments. The system 900 may be an example of the education engine (FIG. 1). The system 900 typically includes one or more processors 902 (e.g., CPUs and/or GPUs), one or more network interfaces 904 (wired and/or wireless), memory 906, and one or more communication buses 905 interconnecting these components.

Memory 906 includes volatile and/or non-volatile memory. Memory 906 (e.g., the non-volatile memory within memory 906) includes a non-transitory computer-readable storage medium. Memory 906 optionally includes one or more storage devices remotely located from the processors 902 and/or a non-transitory computer-readable storage medium that is removably inserted into the server system 900. In some embodiments, memory 906 (e.g., the non-transitory computer-readable storage medium of memory 906) stores the following modules and data:
- an operating system 908 that includes procedures for handling various basic system services and for performing hardware-dependent tasks;
- a network communication module 910 that is used for connecting the education engine 115 to other computing devices via one or more network interfaces 904 connected to one or more networks 140 (FIG. 1);
- content processing module 160 or a portion thereof;
- user learning profile module 170 or a portion thereof; and
- gamification 180 or a portion thereof.

Each of the modules stored in memory 906 corresponds to a set of instructions for performing one or more functions described herein. Separate modules need not be implemented as separate software programs. The modules and various subsets of the modules may be combined or otherwise re-arranged. In some embodiments, memory 906 stores a subset or superset of the modules and/or data structures identified above.

FIG. 9 is intended more as a functional description of the various features that may be present in a server system than as a structural schematic. In practice, items shown separately could be combined and some items could be separated. For example, some items shown separately in FIG. 9 could be implemented on a single server and single items could be implemented by one or more servers. The actual number of servers used to implement the system 900, and how features are allocated among them, will vary from one implementation to another.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of gamification of educational learning to reach an educational objective, the method comprising:
   based on an input of at least a first user's educational objective, building a quest including a plurality of nodes, each node from the plurality of nodes associated with a respective concept from a plurality of concepts associated with the first user's educational objective;
   presenting the quest to the first user;
   receiving an indication of a selection by the first user of a first node from the plurality of nodes;
   in response to receiving the indication of the selection, presenting one or more educational content items from a plurality of educational content items to the first user, the plurality of education content items being included in a content repository, the one or more educational content items from the plurality of educational content items being related to a concept from the plurality of concepts associated with the first node;
   tracking progress of the first user relative to the quest;
   presenting a manifold visualization of a set of concepts present in the plurality of educational content items included in the content repository, the plurality of concepts being a subset of the set of concepts; and
   visually highlighting the quest in the manifold visualization, including visually highlighting the plurality of concepts.

2. The method of claim 1, wherein the one or more educational content items include one or more of an active educational activity, a passive educational activity, or a recall educational activity.

3. The method of claim 1, wherein the one or more educational content items are personalized for the first user based on a learning profile associated with the first user.

4. The method of claim 1, wherein the plurality of nodes includes a start node, an end node, and a set of intermediate nodes.

5. The method of claim 4, wherein the quest includes a primary quest that starts with the start node, ends with the end node, and includes a first subset of the set of intermediate nodes, and each node of the primary quest must be traversed by the first user to complete the quest.

6. The method of claim 5, wherein tracking the progress of the first user relative to the quest includes tracking the progress of the first user relative to the primary quest and the start node, the end node, and the first subset of the set of intermediate nodes.

7. The method of claim 5, wherein the quest includes at least one secondary quest that includes one of the start node, the end node, or a node of the first subset of the set of intermediate nodes of the primary quest as a secondary quest start node and includes a second subset of the set of intermediate nodes.

8. The method of claim 7, further comprising:
   visually presenting the primary quest in a manner different than the at least one secondary quest.

9. The method of claim 5, further comprising displaying a path connecting the start node, the end node, and the nodes of the first subset of the set of intermediate nodes of the primary quest.

10. A computing system comprising one or more processors and memory coupled to the one or more processors, the memory storing one or more programs configured to be executed by the one or more processors, the one or more programs including instructions for:
   based on an input of at least a first user's educational objective, building a quest including a plurality of nodes, each node from the plurality of nodes associated with a respective concept from a plurality of concepts associated with the first user's educational objective;

presenting the quest to the first user;
receiving an indication of a selection by the first user of a first node from the plurality of nodes;
in response to receiving the indication of the selection, presenting one or more educational content items from a plurality of educational content items to the first user, the plurality of education content items being included in a content repository, the one or more educational content items from the plurality of educational content items being related to a concept from the plurality of concepts associated with the first node;
tracking progress of the first user relative to the quest;
presenting a manifold visualization of a set of concepts present in the plurality of educational content items included in the content repository, the plurality of concepts being a subset of the set of concepts; and
visually highlighting the quest in the manifold visualization, including visually highlighting the plurality of concepts.

11. The computing system of claim 10, wherein the one or more educational content items include one or more of an active educational activity, a passive educational activity, or a recall educational activity.

12. The computing system of claim 10, wherein the one or more educational content items are personalized for the first user based on a learning profile associated with the first user.

13. The computing system of claim 10, wherein the plurality of nodes includes a start node, an end node, and a set of intermediate nodes.

14. The computing system of claim 13, wherein the quest includes a primary quest that starts with the start node, ends with the end node, and includes a first subset of the set of intermediate nodes, and each node of the primary quest must be traversed by the first user to complete the quest.

15. The computing system of claim 14, wherein the instructions for tracking progress of the first user relative to the quest include instructions for tracking the progress of the first user relative to the primary quest and the start node, the end node, and the first subset of the set of intermediate nodes.

16. The computing system of claim 14, wherein the quest includes at least one secondary quest that includes one of the start node, the end node, or a node of the first subset of the set of intermediate nodes of the primary quest as a secondary quest start node and includes a second subset of the set of intermediate nodes.

17. The computing system of claim 16, wherein the one or more programs further include instructions for visually presenting the primary quest in a manner different than the at least one secondary quest.

18. The computing system of claim 14, wherein the one or more programs further include instructions for displaying a path connecting the start node, the end node, and the nodes of the first subset of the set of intermediate nodes of the primary quest.

* * * * *